(12) United States Patent
Shin et al.

(10) Patent No.: US 10,539,738 B2
(45) Date of Patent: Jan. 21, 2020

(54) BACKLIGHT MODULE WITH BLOCKING MEMBER FOR BLOCKING LIGHT LEAKAGE AND DISPLAY DEVICE WITH THE SAME

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Mookeun Shin, Beijing (CN); Zhenyu Han, Beijing (CN); Qiang Zhang, Beijing (CN); Hui Dong, Beijing (CN); Haifeng Xu, Beijing (CN); Aixia Sang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 16/173,961

(22) Filed: Oct. 29, 2018

(65) Prior Publication Data

US 2019/0243059 A1 Aug. 8, 2019

(30) Foreign Application Priority Data

Feb. 8, 2018 (CN) .......................... 2018 1 0131987

(51) Int. Cl.
*F21V 8/00* (2006.01)
(52) U.S. Cl.
CPC ................................. *G02B 6/0088* (2013.01)
(58) Field of Classification Search
CPC .................................................... G02B 6/0088
See application file for complete search history.

(56) References Cited

U.S. PATENT DOCUMENTS

2016/0259120 A1* 9/2016 Hsiao .................. G02B 6/0088
2018/0356581 A1* 12/2018 Chen ..................... G02B 6/005

* cited by examiner

*Primary Examiner* — Joseph L Williams
(74) *Attorney, Agent, or Firm* — Kinney & Lange, P.A.

(57) ABSTRACT

A backlight module and a display device are provided in the present disclosure. The backlight module includes: a light guide plate, a plastic frame and a back plate; the back plate includes an accommodating portion and a folded edge perpendicular to the accommodating portion; the light guide plate is disposed on the accommodating portion; the plastic frame is configured to be in a snap engagement with the folded edge of the back plate and includes an outer blocking wall and a carrying portion perpendicular to the outer blocking wall; and a blocking member is disposed between the folded edge and the light guide plate, and the blocking member is configured to block light leakage at a position where the outer blocking wall and the folded edge are snap engaged.

13 Claims, 7 Drawing Sheets

BACKLIGHT MODULE WITH BLOCKING MEMBER FOR BLOCKING LIGHT LEAKAGE AND DISPLAY DEVICE WITH THE SAME

CROSS-REFERENCE TO RELATED APPLICATION

The present application claims the benefit of Chinese Patent Application No. 201810131987.9 filed on Feb. 8, 2018 in the China National Intellectual Property Administration, the whole disclosure of which is incorporated herein by reference.

BACKGROUND

Technical Field

The present disclosure relates to a field of display technology, and more specifically, to a backlight module and a display device.

Description of the Related Art

In the field of liquid crystal display technology, the backlight module is one of the most critical components of the liquid crystal display device, and its light-emitting performance will affect directly the visual effect of the liquid crystal display module. With the development of technology and the increasing demands of the customer in the production's appearance, an ultra-thin display with a narrow frame has been developed gradually. The structure of the backlight module will affect directly the width and thickness of the frame of the display. However, in the process of improving the structure of the backlight module, it is found that a problem of light leakage of the back plate may occur.

SUMMARY

According an aspect of the present disclosure, there is provided a backlight module comprising: a light guide plate, a plastic frame and a back plate; wherein the back plate comprises an accommodating portion and a folded edge perpendicular to the accommodating portion; the light guide plate is disposed on the accommodating portion; the plastic frame is configured to be in a snap engagement with the folded edge of the back plate and comprises an outer blocking wall and a carrying portion perpendicular to the outer blocking wall; and a blocking member is disposed between the folded edge and the light guide plate, and the blocking member is configured to block light leakage at a position where the outer blocking wall and the folded edge are snap engaged.

In an embodiment of the present disclosure, the plastic frame further comprises an inner blocking wall disposed on a side of the outer blocking wall close to the light guide plate and arranged side by side with the outer blocking wall, and the folded edge of the back plate is adapted to be inserted between the outer blocking wall and the inner blocking wall, and wherein the blocking member comprises a first blocking member having a first light blocking portion and a first fixing portion perpendicular to the first light blocking portion, the first light blocking portion of the first blocking member is disposed on a side of the inner blocking wall close to the light guide plate, the first fixing portion of the first blocking member is disposed on the carrying portion, and the first fixing portion and the first light blocking portion of the first blocking member form collectively an L-shaped blocking member.

In an embodiment of the present disclosure, the first light blocking portion and the first fixing portion of the first blocking member are adhered to the inner blocking wall and the carrying portion respectively with adhesive.

In an embodiment of the present disclosure, one of the outer blocking wall and the folded edge is provided with a plurality of snap portions that are spaced apart from each other, the other one of the outer blocking wall and the folded edge is provided with a plurality of snap blind holes that are spaced apart from each other, the snap portions are adapted to be in a snap engagement with the snap blind holes respectively, the blocking member further comprises a second blocking member having a first light blocking portion and a first fixing portion perpendicular to the first light blocking portion, the first light blocking portion of the second blocking member is disposed between the position where the outer blocking wall and the folded edge are snap engaged and the light guide plate, the first fixing portion of the second blocking member is disposed on the carrying portion, and the first fixing portion and the first light blocking portion of the second blocking member form collectively an L-shaped blocking member.

In an embodiment of the present disclosure, the first fixing portion of the second blocking member is adhered to the carrying portion with adhesive.

In an embodiment of the present disclosure, the first light blocking portion has a thickness greater than a thickness of the first fixing portion.

In an embodiment of the present disclosure, the first light blocking portion has a thickness of 0.3 mm or less.

In an embodiment of the present disclosure, the first light blocking portion has a thickness of 0.1 mm or less.

In an embodiment of the present disclosure, at least two corners of the back plate are symmetrically provided with an L-shaped elastic positioning member, and the elastic positioning member is disposed between the folded edge and the light guide plate to limit moving range of the light guide plate.

In an embodiment of the present disclosure, the elastic positioning member comprises a second light blocking portion and a second fixing portion perpendicular to the second light blocking portion, the second fixing portion is fixed onto the accommodating portion, and the second light blocking portion is located between the inner blocking wall and the light guide plate.

In an embodiment of the present disclosure, a height of the inner blocking wall is less than a height of the folded edge, so that the second light blocking portion is sandwiched between the inner blocking wall and the accommodating portion.

In an embodiment of the present disclosure, the back plate has a thickness of 1 mm or less.

According an aspect of the present disclosure, there is provided a display device comprising a display panel, wherein the display device further comprises the backlight module according to claim 1, and the display panel is assembled to the carrying portion of the backlight module.

BRIEF DESCRIPTION OF THE DRAWINGS

Other features, objects, and advantages of the present disclosure will become more apparent from the detailed description to the illustrative embodiments with reference to the accompanying drawings.

DETAILED DESCRIPTION

The present disclosure will be further described in detail below in connection with the accompanying drawings and embodiments. It is understood that the specific embodiments described herein are merely used for explaining, rather than limiting the present disclosure. It should also be noted that, for convenience of description, only those parts related to the present disclosure are shown in the drawings.

It is noted that the embodiments and their features in the present disclosure may be combined in any way without conflict. The present disclosure will be described in detail below with reference to the drawings and embodiments.

According to the general inventive concept of the present disclosure, there is provided a backlight module comprising: a light guide plate, a plastic frame and a back plate; wherein the back plate comprises an accommodating portion and a folded edge perpendicular to the accommodating portion; the light guide plate is disposed on the accommodating portion; the plastic frame is configured to be in a snap engagement with the folded edge of the back plate and comprises an outer blocking wall and a carrying portion perpendicular to the outer blocking wall; and a blocking member is disposed between the folded edge and the light guide plate, and the blocking member is configured to block light leakage at a position where the outer blocking wall and the folded edge are snap engaged.

According to a technical solution provided by the embodiment of the present disclosure, the problem of light leakage of the back plate may be solved by providing a blocking member at a junction of an inner blocking wall and a carrying portion. Further, according to some embodiments of the present disclosure, by providing an elastic positioning member at the corner of the back plate, a moving range of the light guide plate may be limited, and thus a damage caused by the excessively movement of the light guide plate may be avoided, thereby protecting the light guide plate.

Figure 1:
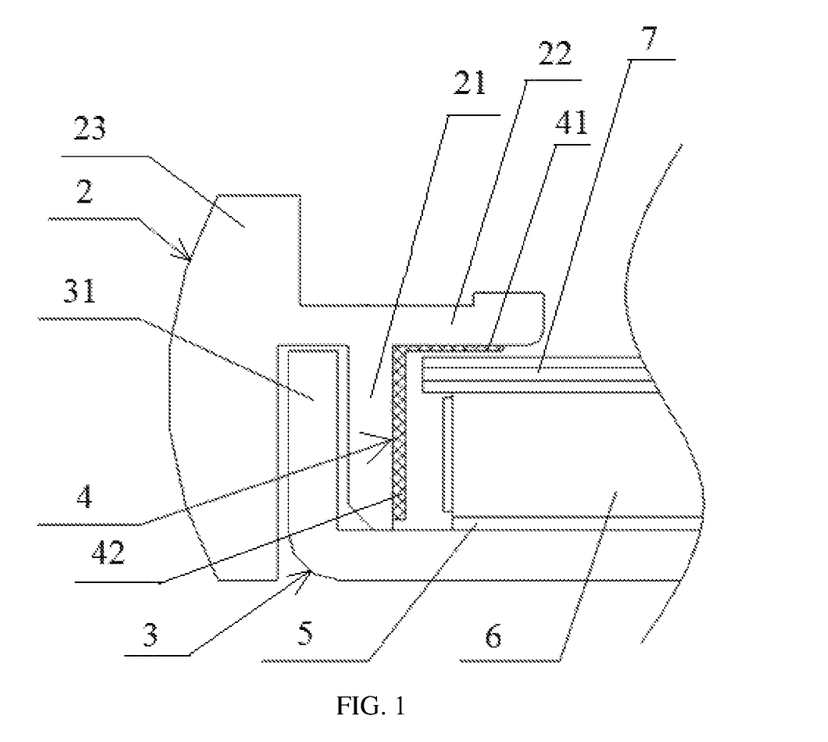
FIG. 1 illustrates an exemplary structure of a backlight module according to an embodiment of the present disclosure.
Figure 2:
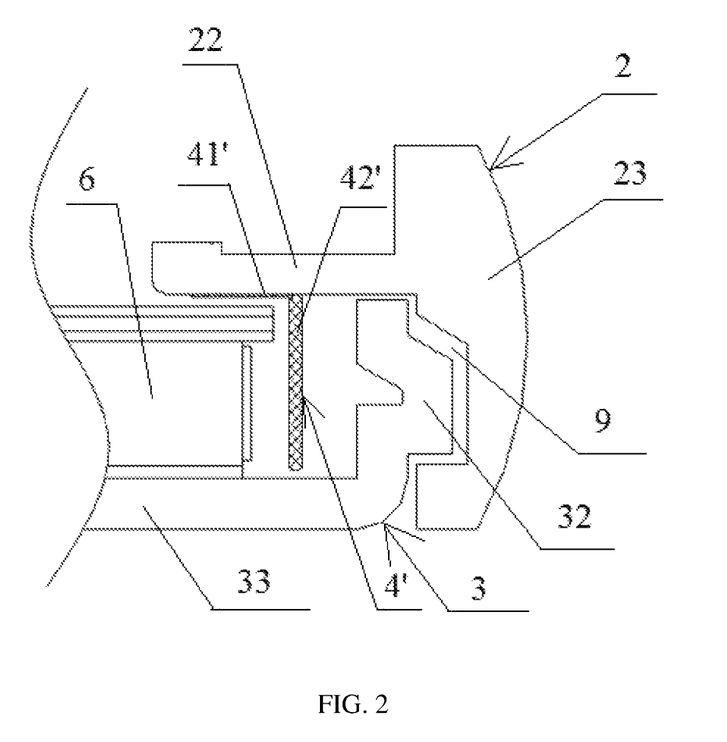
FIG. 2 illustrates an exemplary structure of a snap blind hole of a backlight module according to an embodiment of the present disclosure.
Figure 3:
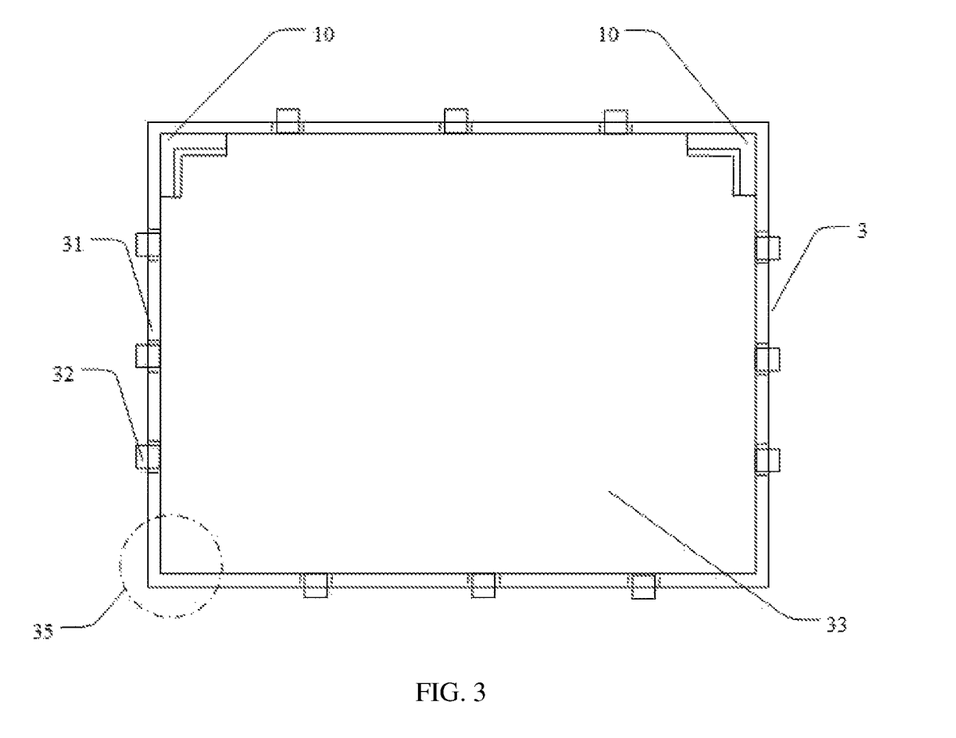
FIG. 3 illustrates an exemplary structure of a back plate according to an embodiment of the present disclosure.

Referring to FIGS. 1-3, in which FIG. 1 illustrates an exemplary structure of a backlight module according to an embodiment of the present disclosure; FIG. 2 illustrates an exemplary structure of a snap blind hole of a backlight module according to an embodiment of the present disclosure; FIG. 3 illustrates an exemplary structure of a back plate according to an embodiment of the present disclosure.

As shown in the Figures, the backlight module comprises: a light guide plate 6, an optical diaphragm 7, a plastic frame 2 and a back plate 3.

The back plate comprises an accommodating portion 33, a folded edge 31 perpendicular to the accommodating portion 33, and a plurality of snap portions 32 spaced apart from each other on the folded edge 31. The light guiding plate 6 is disposed on the accommodating portion 33, and the optical diaphragm 7 is disposed on the light guide plate 6.

The plastic frame 2 comprises an inner blocking wall 21 and an outer blocking wall 23 disposed side by side. The plastic frame 2 further comprises a carrying portion 22 disposed perpendicularly to the inner blocking wall 21 and the outer blocking wall 23. The outer blocking wall is provided with snap blind holes 9 spaced apart from each other to be in a snap engagement with the snap portions 32.

A blocking member is disposed between the folded edge 31 and the light guide plate 6 to block a light leakage between the plastic frame 2 and the snap portions 32.

It is noted that the reflector plate 5 in the backlight module may be disposed between the light guide plate 6 and the back plate 3 as shown in FIG. 1, or alternatively disposed in the optical diaphragm 7 as required.

A plurality of snap portions 32 are disposed on the folded edge 31 of the back plate 3 and is disposed apart from each other. The plastic frame 2 is provided with an inner blocking wall 21 and an outer blocking wall 23 which are arranged side by side. There is a groove between the inner blocking wall 21 and the outer blocking wall 23. A plurality of snap blind holes 9 are provided at the positions of the outer blocking wall 23 corresponding to the respective snap portions 31. When the back plate 3 and the plastic frame 2 are assembled, the snap portions 31 are snapped into respective snap blind holes 9, and the folded edge 31 is engaged in the groove between the inner blocking wall 21 and the outer blocking wall 23. At this time, there is a gap among the snap portion 32, the snap blind hole 9 and the carrying portion 22. If there is no inner blocking wall 21 disposed at the position of each snap portion 32, light from the light guide plate would passes through the gap and thus be leaked out. If a blocking member is provided between the snap portion 32 and the light guide plate 6, the blocking member may block the light leakage between the plastic frame 2 and the snap portion 32.

Referring to FIG. 1, the blocking member comprises a first blocking member 4 (see FIG. 1) and a second blocking member 4' (see FIG. 2). The first blocking member 4 comprises a first light blocking portion 42 and a first fixing portion 41 perpendicular to the first light blocking portion 42. The first light blocking portion 42 of the first blocking member 4 is disposed at the inner side of the inner blocking wall. The first fixing portion 41 of the first blocking member 4 is disposed on the carrying portion 22. The first light blocking portion 42 and the first fixing portion 41 form an L-shaped blocking member. As shown in FIG. 1, the blocking member 4 comprises a first light blocking portion 42 and a first fixing portion 41 perpendicular to the first light blocking portion 42. The first light blocking portion 42 is disposed at the inner side of the inner blocking wall 21. In the context, the inner side of the inner blocking wall 21 refers to a side of the inner blocking wall 21 facing to the light guide plate 6. The first fixing portion 41 is disposed at the inner side of the carrying portion 22. Similarly, the inner side of the carrying portion 22 herein refers to a side of the carrying portion 22 facing to the light guide plate 6. The first light blocking portion 42 and the first fixing portion 41 form an L-shaped blocking member. The first light blocking portion and the first fixing portion of the first blocking member are adhered to the inner blocking wall and the carrying portion with adhesive.

Referring to FIG. 2, the second blocking member 4' comprises a first light blocking portion 42' and a first fixing portion 41' perpendicular to the first light blocking portion 42'. The first light blocking portion 42' of the second blocking member 4' is disposed between the snap portion 32 and the light guide plate 6. The first fixing portion 41' of the second blocking member 4' is disposed at the inner side of the carrying portion 22 to form an L-shaped blocking member with the first fixing portion 41'. There is no inner blocking wall 21 disposed at the position of the plastic frame 2 corresponding to the snap portion 32. Therefore, the light leakage through the gap between the snap portion 32 and the plastic frame 2 may be blocked by the second blocking member 4'. The first fixing portion 41' of the second blocking member 4' is adhered to the carrying portion with adhesive.

As shown in FIG. 1, the thickness of the first light blocking portion 42 is greater than the thickness of the first fixing portion 41. In order to minimize the influence on the thickness of the backlight module, the thickness of the first fixing portion 41 should be as thin as possible. On the other hand, the first light blocking portion 42 should have a certain thickness to block the light leakage effectively.

Alternatively, the thickness of the first light blocking portion 42 is less than or equal to 0.3 mm.

Alternatively, the thickness of the first fixing portion 41 is less than or equal to 0.1 mm.

Alternatively, the thickness of the back plate 3 is less than or equal to 1 mm.

The blocking member is made of PET (polyethylene terephthalate) material.

Figure 4:
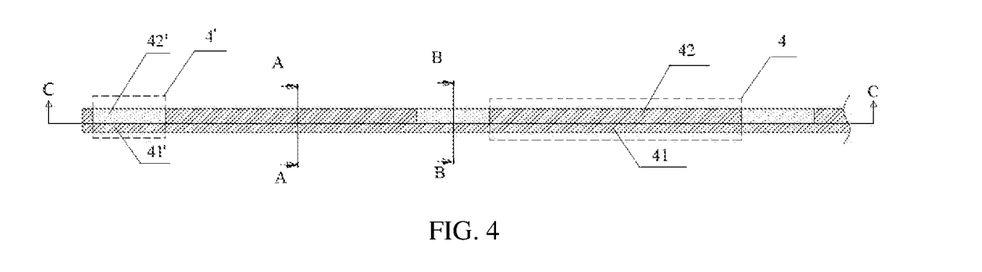
FIG. 4 illustrates an unfolded view of an exemplary blocking member according to an embodiment of the present disclosure.
Figure 5:
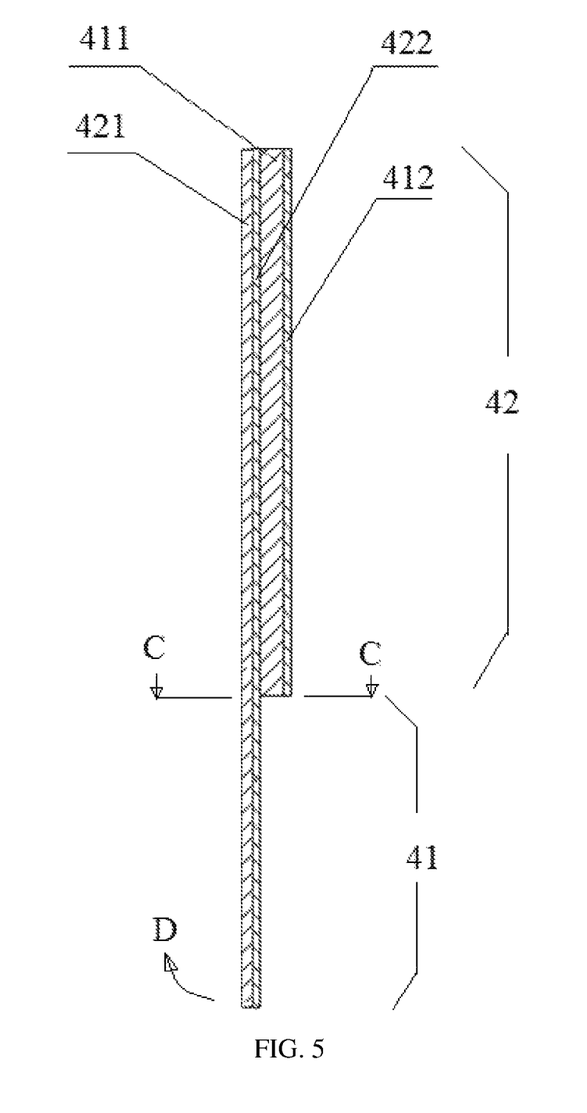
FIG. 5 illustrates a partial sectional view of FIG. 4 taken along a line A-A, which is enlarged for detail.
Figure 6:
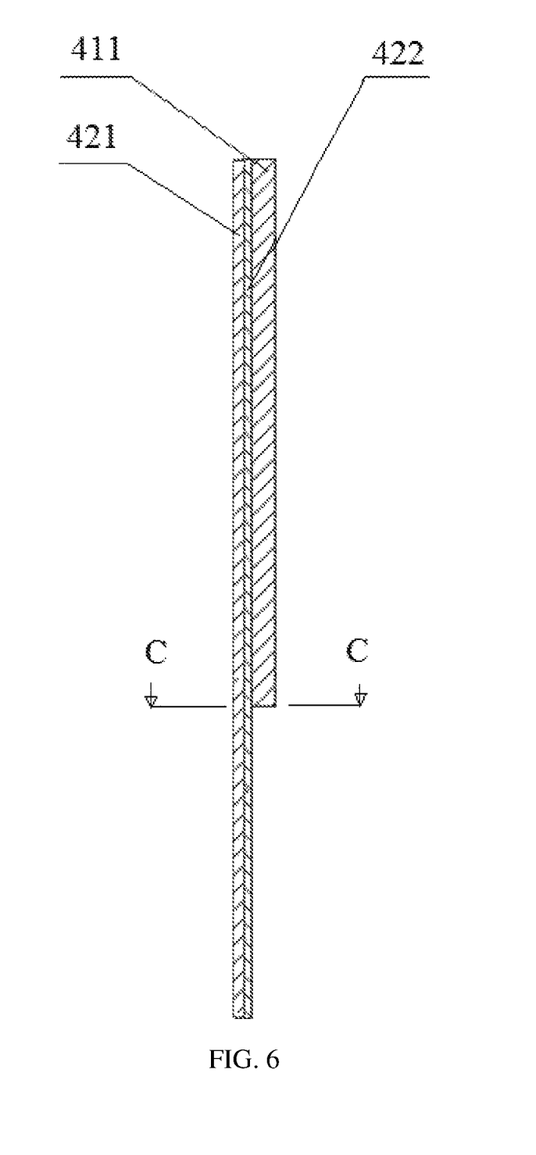
FIG. 6 illustrates a partial sectional view of FIG. 4 taken along a line B-B, which is enlarged for detail.

FIGS. 4-6 further illustrate the structure that may be used for the blocking member. FIG. 4 illustrates an unfolded view of an exemplary blocking member according to an embodiment of the present disclosure; FIG. 5 illustrates a partial sectional view of FIG. 4 taken along a line A-A, which is enlarged for detail; FIG. 6 illustrates a partial sectional view of FIG. 4 taken along a line B-B, which is enlarged for detail. As shown in FIG. 4, the first light blocking portion and the first fixing portion are unfolded. That is, both of them are located in a same plane. As shown in the Figure, the first blocking member 4 and the second blocking member 4' are disposed alternately. The first light blocking portion 42 and the first fixing portion 41 of the first blocking member 4 are applied with adhesive to be adhered to the inner blocking member and the carrying portion. The first fixing portion 41' of the second blocking member 4' is applied with adhesive to be adhered to the carrying portion, while the first light blocking portion 42' of the second blocking member 4' is not applied with adhesive. The second blocking member 4' is disposed at the position of the plastic frame corresponding to the snap portion where no inner blocking wall is disposed. Thus the first light blocking portion 42' of the second blocking member 4' does not need to be applied with adhesive. Before the blocking member is adhered onto the plastic frame, the first light blocking portion and the first fixing portion are bent along a line C-C and thus form an L shape. Then they are attached to the junction of the inner blocking wall and the carrying portion. In a practice, the first blocking member may employ the structure as shown in FIG. 5, which includes a first adhesive tape 411 and a second adhesive tape 421, with an adhesive layer 412 disposed on one side of the first adhesive tape 411 and an adhesive layer 422 disposed between the second adhesive tape 421 and the first adhesive tapes 411. The thickness of the first adhesive tape 411 is greater than the thickness of the second adhesive tape 421, so that light leakage may be blocked effectively. The area of the first adhesive tape is the same as the area of the first light blocking portion 42. The area of the second adhesive tape 421 is the sum of the area of the first light blocking portion 42 and that of the first fixing portion 41. Before the blocking member is adhered to the plastic frame, the first fixing portion 41 may be bent in a direction D along a line C-C, so that the first fixing portion 41 and the first light blocking portion 42 form an L shape. The second blocking member may employ the structure as shown in FIG. 6, which differs from FIG. 5 only in that the first adhesive tape 411 has no adhesive layer 412 thereon.

Figure 7:
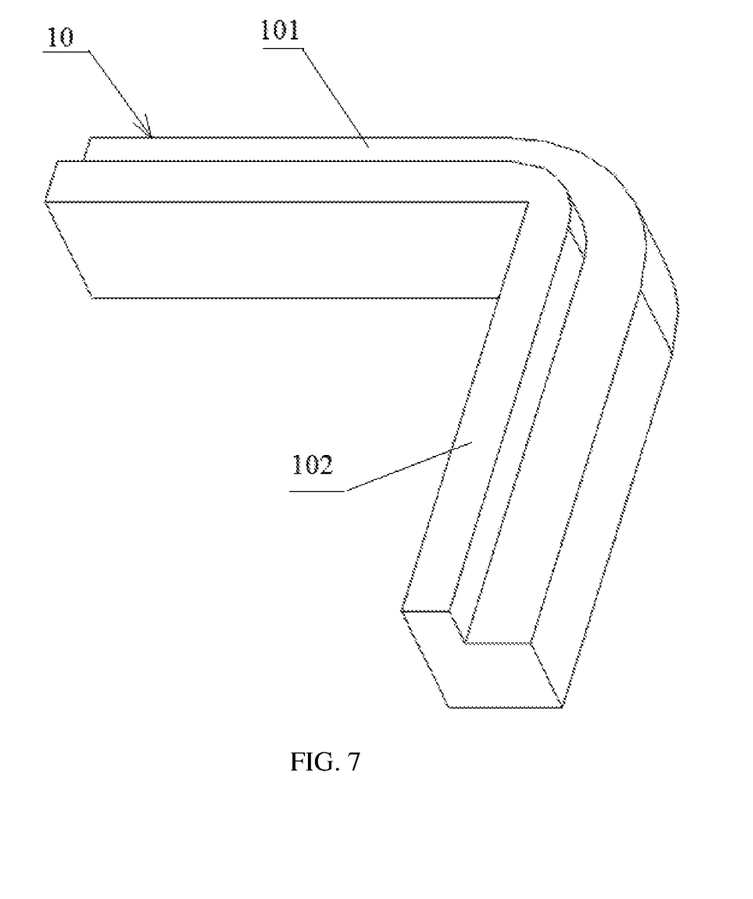
FIG. 7 illustrates an exemplary structure of an elastic positioning member according to an embodiment of the present disclosure.
Figure 8:
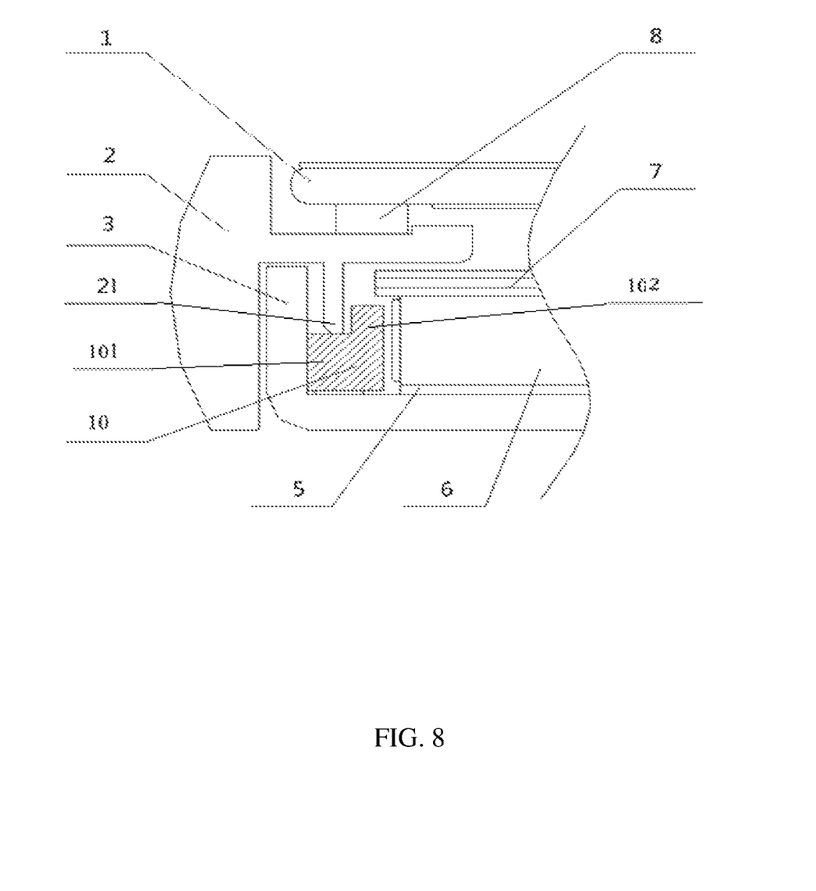
FIG. 8 illustrates an exemplary structure of a corner of the backlight module according to an embodiment of the present disclosure.

On the other hand, referring to FIG. 7, FIG. 8 and FIG. 3, an exemplary structure of an elastic positioning member according to an embodiment of the present disclosure is illustrated. FIG. 8 illustrates an exemplary structure of a corner of the backlight module according to an embodiment of the present disclosure. FIG. 3 illustrates an exemplary structure of a back plate according to an embodiment of the present disclosure.

At least two corners of the back plate 3 are symmetrically disposed with an L-shaped elastic positioning member 10 for limiting moving range of the light guide plate. As shown in FIG. 3, the two elastic positioning members 10 are symmetrically disposed at the left and right corners of the upper portion of the back plate 3. The corner 35 of the backing plate herein refers to the junction of the two adjacent folded edges of the backing plate and the accommodating portion 33. It is understood that the elastic positioning members may be disposed at two corners of any side of the back plate 3 or at four corners of the back plate 3.

The elastic locating member 10 comprises a second light blocking portion 101 and a second fixing portion 102 perpendicular to the second light blocking portion 101. The second fixing portion 102 is fixed onto the accommodating portion 33 of the back plate 3, and the second light blocking portion 101 is located between the inner blocking wall 21 and the light guide plate 6. The elastic positioning member 10 is used to limit the moving range of the light guide plate to ensure safety of the light guide plate during its transportation. The elastic positioning member has a certain thickness and may withstand a certain collision force. Therefore, the length of the inner blocking wall at this position is shorter than the length of the inner blocking wall at the position where no elastic positioning member is disposed. Therefore, in order to prevent the light leakage from the inner blocking wall at this position, as shown in FIG. 7 and FIG. 8, the second fixing portion 102 of the elastic positioning member 10 is convex with respect to the second light blocking portion 101 in a direction away from the accommodating portion 33.

In some embodiments, the elastic positioning member is made of silicone material.

The present disclosure further provides a display device comprising a display panel 1 and a backlight module provided in each embodiment of the present disclosure. The display panel 1 is assembled to the carrying portion 8 of the backlight module.

In the description of the present disclosure, it is to be understood that the orientation or position relationship indicated by the terms "upper", "lower", "left", "right", etc. is based on the orientation or position relationship shown in the drawings. These terms are used to describe the present disclosure and simplify the description only, but not intended to indicate or imply the device or element referred to must have the certain orientation or be operated in the certain orientation, and thus may not be considered as a limitation to the present disclosure.

It should also be noted that, in this context, relational terms such as first and second, etc. are used merely to distinguish one object or operation from another object or operation, without necessarily requiring or implying that there is any such actual relationship or order between such objects or operations. Furthermore, the term "comprise", "include" or any other variants thereof is intended to encompass a non-exclusive inclusion, such that a process, method, article, or device that comprises a plurality of elements comprises not only those elements but also other elements that are not explicitly listed, or elements that are inherent to such a process, method, article, or device. An element defined by the phrase "comprising a . . . ", without further limitation, does not exclude the presence of additional identical elements in the process, method, article, or device that comprises the elements.

The above description is only an exemplary embodiment of the present disclosure and an illustration of the principles of the applied technology. It should be understood by those skilled in the art that the scope of the present disclosure referred to in the present disclosure is not limited to the specific combination of the above technical features, and should also cover other technical solutions formed by any combination of the above technical features and their equivalent features without departing from the inventive concept. Such technical solution may be formed by mutual replacement of the technical features (but not limited thereto) having similar functions disclosed in the present disclosure and the above technical feature.

What is claimed is:

1. A backlight module comprising: a light guide plate, a plastic frame and a back plate; wherein:
   the back plate comprises an accommodating portion and a folded edge perpendicular to the accommodating portion;
   the light guide plate is disposed on the accommodating portion;
   the plastic frame is configured to be in a snap engagement with the folded edge of the back plate and comprises an outer blocking wall and a carrying portion perpendicular to the outer blocking wall; and
   a blocking member is disposed between the folded edge and the light guide plate, and the blocking member is configured to block light leakage at a position where the outer blocking wall and the folded edge are snap engaged.

2. The backlight module according to claim 1, wherein the plastic frame further comprises an inner blocking wall disposed on a side of the outer blocking wall close to the light guide plate and arranged side by side with the outer blocking wall, and the folded edge of the back plate is adapted to be inserted between the outer blocking wall and the inner blocking wall, and wherein the blocking member comprises a first blocking member having a first light blocking portion and a first fixing portion perpendicular to the first light blocking portion, the first light blocking portion of the first blocking member is disposed on a side of the inner blocking wall close to the light guide plate, the first fixing portion of the first blocking member is disposed on the carrying portion, and the first fixing portion and the first light blocking portion of the first blocking member form collectively an L-shaped blocking structure.

3. The backlight module according to claim 2, wherein the first light blocking portion and the first fixing portion of the first blocking member are adhered to the inner blocking wall and the carrying portion respectively with adhesive.

4. The backlight module according to claim 1, wherein one of the outer blocking wall and the folded edge is provided with a plurality of snap portions that are spaced apart from each other, the other one of the outer blocking wall and the folded edge is provided with a plurality of snap blind holes that are spaced apart from each other, the snap portions are adapted to be in a snap engagement with the snap blind holes respectively, the blocking member further comprises a second blocking member having a first light blocking portion and a first fixing portion perpendicular to the first light blocking portion, the first light blocking portion of the second blocking member is disposed between the position where the outer blocking wall and the folded edge are snap engaged and the light guide plate, the first fixing portion of the second blocking member is disposed on the carrying portion, and the first fixing portion and the first light blocking portion of the second blocking member form collectively an L-shaped blocking structure.

5. The backlight module according to claim 4, wherein the first fixing portion of the second blocking member is adhered to the carrying portion with adhesive.

6. The backlight module according to claim 4, wherein the first light blocking portion has a thickness greater than a thickness of the first fixing portion.

7. The backlight module according to claim 6, wherein the first light blocking portion has a thickness of 0.3 mm or less.

8. The backlight module according to claim 6, wherein the first light blocking portion has a thickness of 0.1 mm or less.

9. The backlight module according to claim 2, wherein at least two corners of the back plate are symmetrically provided with an L-shaped elastic positioning member, and the elastic positioning member is disposed between the folded edge and the light guide plate to limit moving range of the light guide plate.

10. The backlight module according to claim 9, wherein the elastic positioning member comprises a second light blocking portion and a second fixing portion perpendicular to the second light blocking portion, the second fixing portion is fixed onto the accommodating portion, and the second light blocking portion is located between the inner blocking wall and the light guide plate.

11. The backlight module according to claim 10, wherein a height of the inner blocking wall is less than a height of the folded edge, so that the second light blocking portion is sandwiched between the inner blocking wall and the accommodating portion.

12. The backlight module according to claim 1, wherein the back plate has a thickness of 1 mm or less.

13. A display device comprising a display panel, wherein the display device further comprises the backlight module according to claim 1, and the display panel is assembled to the carrying portion of the backlight module.

* * * * *